Dec. 25, 1934.   A. S. FITZ GERALD   1,985,563
CONTROL SYSTEM FOR ESCALATORS, CONVEYERS, AND THE LIKE
Filed Sept. 9, 1933

INVENTOR
Alan S. FitzGerald

Patented Dec. 25, 1934

1,985,563

UNITED STATES PATENT OFFICE 1,985,563

CONTROL SYSTEM FOR ESCALATORS, CONVEYERS, AND THE LIKE

Alan Stewart Fitz Gerald, Wynnewood, Pa.

Application September 9, 1933, Serial No. 688,751
In Great Britain September 14, 1932

10 Claims. (Cl. 198—16)

The present invention relates to electric control systems for escalators, conveyers and similar apparatus.

In conveyers which normally are in continuous operation irrespective of the number or frequency of supply of the objects to be carried there is a considerable waste of power during the slack periods when objects are only being supplied to the conveyer at infrequent intervals.

It is an object of my invention to avoid this unnecessary expense and to provide a control system for conveyers by means of which the conveyer is started by the approach of passengers or by the placing of an object upon the conveyer.

It is a further object of the invention to provide automatic control for conveyers in which the conveyer is started by the approach of an object to be carried and is stopped automatically after a given time interval.

Another object is to provide a conveyer system controlled by the approach of an object to be carried in which the approach of an object starts the conveyer, which is stopped automatically after it has travelled a predetermined distance.

Still another object of my invention is to provide a conveyer control system in which wear is prevented due to intermittent rapid operation of the contacts which the system comprises.

Still another object of my invention is to provide a control system in which a constant supply of objects to be carried causes the continuous operation of the conveyer until the supply diminishes, whereafter the operation takes place intermittently as before.

Other objects will be apparent from the description as it proceeds.

In one form the invention may comprise a light-sensitive device adapted, in response to a change in its condition brought about by the approach of an object to be carried, to operate through a relay or relays the starting contactor system of the driving motor for the conveyer. A definite time device embodied in the system effects the operation of the stopping contacts of the motor after a predetermined period of time. In one form the definite time device is provided in the starting apparatus of the motor or it may be a circuit associated with the light-sensitive device and the relay. In another form of the automatic control system, I provide the definite time device in an amplifying circuit associated with the light-sensitive device.

The invention applied to apparatus such as passenger escalators, goods conveyers and similar apparatus which are ordinarily in continuous operation, effects a considerable saving in personnel and in energy consumption. For instance, passenger escalators are usually fully loaded during rush hours and comparatively empty during the slack hours. Accordingly, I provide at the entering end of the escalator, preferably several yards therefrom, a light-sensitive cell or device and a light source directed towards the cell adapted to be interrupted by a passenger approaching the escalator, and effective to operate a relay, if necessary through an amplifier circuit, which relay itself operates a further relay or definite time delay device directly controlling the starting contactor system of the escalator.

Suppose for example, it takes 30 seconds to convey a passenger from one end of the escalator to the other. The definite time delay device would be set for say 35 seconds. When the last passenger has left the escalator and no more approach the entrance will automatically shut down due to the dropping out of the relay controlling the escalator motor. It will remain shut down until another passenger approaches the entrance when it will automatically start up during the time the passenger covers the distance between the light-sensitive device and the beginning of the escalator. Having completed this trip it will again shut down until further required. During rush hours the light-sensitive control will be actuated momentarily much more frequently than every 35 seconds. The escalator will therefore operate as long as the demand persists.

The accompanying drawing illustrates one form of the invention as applied to an escalator.

Figure 1:
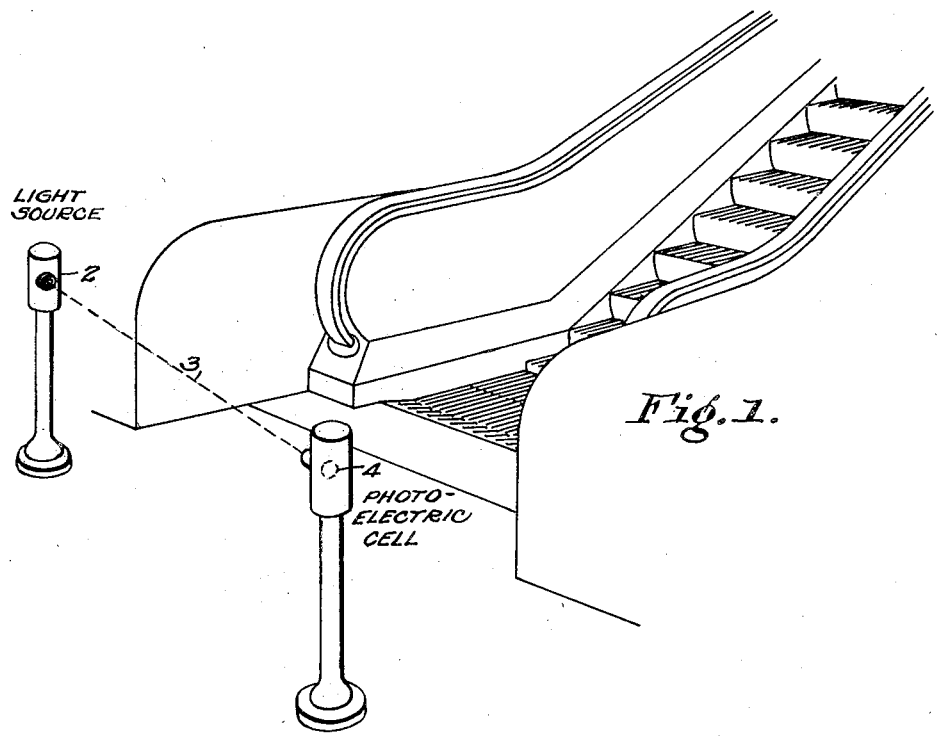
Fig. 1 shows a perspective view of an escalator provided with the automatic control system according to the invention.

Referring first to Fig. 1, at the entrance to an escalator 1 there is provided a light beam detecting arrangement, comprising a light source conveniently housed at 2, which directs a beam of light 3 across the pathway upon a light-sensitive device situated at 4. It will be seen that passengers entering the escalator will intercept the beam of light 3 thus causing a fluctuation in the illumination of the photo-cell 4.

Figure 2:
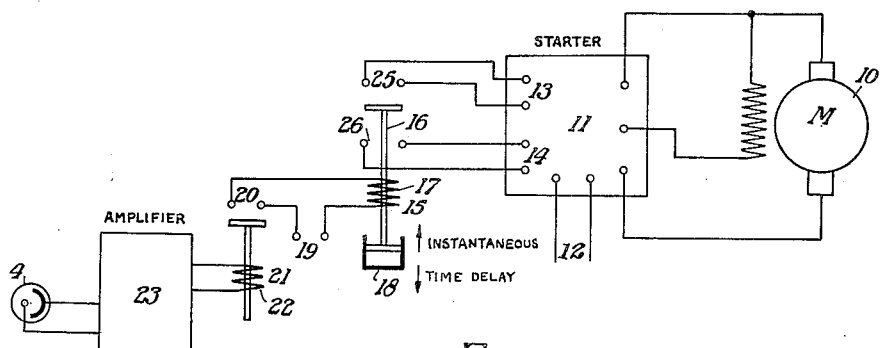
Fig. 2 shows a diagram of a circut suitable for automatically controlling the escalator; and, Figure 3 shows a diagram of a modification of the circuit shown in Figure 2.

In Fig. 2 a circuit arrangement is shown which may be employed to cause the current variations produced in the light-sensitive device to control the escalator. This apparatus comprises a motor 10 for driving the escalator, which is connected to a starter 11. The starter is in turn connected to the supply mains 12 and comprises the starting and stopping contacts 13 and 14. In place of the usual push buttons the starting contacts are connected to the four contacts of a relay 15 which comprises an armature 16, operating coil 17 and a dash-pot 18. The dash-pot 18 is so arranged that the armature 16 pulls up rapidly when the coil is energized but sinks slowly when de-energized. The coil 17 is connected in a local circuit comprising a source 19 and relay contact 20.

The relay contact 20 is closed by the armature of a relay 21, the coil 22 of which is energized by the output of an amplifier 23. The input of the amplifier 23 comprises the photo-cell 4 which serves to detect the interception of the light ray 3 by intending passengers.

When the light ray is interrupted, the consequent current variation in the photo-cell 4 is amplified by the amplifier 23 and causes the relay 21 to be energized whereby the contact 20 is closed. This energizes the relay 15 which closes its upper contacts 25 thus operating the motor starter and starting up the escalator. Provided that no further passengers interrupt the light ray, the relay 21 is only momentarily energized, as is also therefore the relay 15. However, the armature 16 falls away from the contact 25 slowly under control of the dash-pot 18 until it closes the contact 26. Closure of the contact 26 operates the stop circuit of the motor starter, thus bringing the installation to rest. The dash-pot 18 is adjusted so that sufficient time is afforded before operation of the stop contact for a passenger to complete the trip.

If the light beam 3 is interrupted repeatedly in rapid succession, the relay 21 will close the local circuit by operating the relay 15 repeatedly in rapid succession so that the armature 16 has insufficient time to return to the resting position and close the contact 26. The driving motor is thus maintained in continuous operation while a number of people are passing through the light beam.

While I have described and shown in the figure a specific embodiment of my invention more particularly to explain clearly the principles upon which it operates, I wish it to be clearly understood that many other modifications and refinements thereof may be made.

For example, during times at which traffic is heavy it is obvious that, as previously described, the escalator will be maintained in continuous operation due to the fact that passengers enter thereupon at more frequent intervals than the time delay provided in the control circuit. The relay controlled by the photo-electric cell will therefore be repeatedly operated a large number of times during such periods. While the photoelectric control might be put out of action during the rush hour periods, as for example, by means of a time switch adjusted to close the starting circuit of the escalator continuously during such times, this procedure is open to the objection that rush hours on transportation systems do not always occur at exactly the same times on different days of the week. Moreover, the installation of a time switch involves additional expense.

In order to avoid these difficulties I prefer to provide an electric circuit, equivalent to that shown in the figure in which the control functions described with reference to the means shown in the figure for actuating the motor starter are carried out with a minimum of contacts or moving parts. I prefer to use for the purpose of furnishing time delay action, instead of electromechanical devices embodying moving parts, an electric circuit including an energy storage device for example a condenser. Thus each time the light-sensitive element is actuated by the presence of a passenger the condenser is charged substantially instantaneously by an electron discharge tube, rectifier, or the like. A high resistance path is furnished through which the charge received by the condenser may be slowly dissipated. The voltage of the condenser is utilized to energize the grid of a further electron discharge tube or other suitable means which may operate an instantaneous relay adapted to actuate the motor starter. It will be apparent to those skilled in the art that with such an arrangement, during the rush hour period when the photo-cell is actuated repeatedly no action of any relay or contact will take place, the only dynamic effect resulting being the repeated recharging of the condenser.

Figure 3:
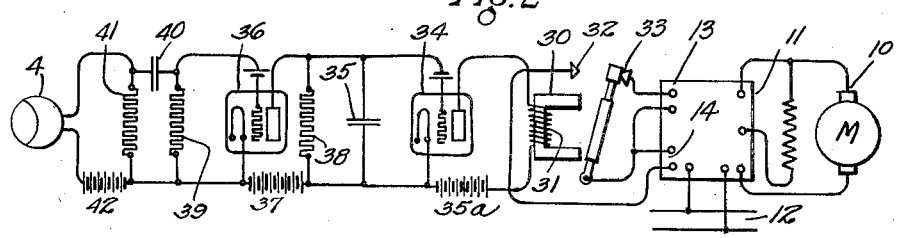

Such an arrangement is illustrated in Figure 3.

In Figure 3 I show the photo-electric cell 4, motor 10, motor starter 11, and supply circuit 12, all as in Figure 2.

In Figure 3, 30 is the instantaneous relay having an operating coil 31, contacts 32 closed when energized, and contacts 33 closed when de-energized. Contacts 33, as shown in the drawing, close the starting circuit 13 of the motor starter 11, and contacts 32 are connected to the stopping circuit 14.

The electron discharge tube 34 includes the relay coil 31 in its anode circuit which is energized from a suitable source 35a. The tube 34 is controlled in accordance with the charge on the condenser 35, the grid being connected to one side of the condenser and the cathode to the other.

I show in Figure 3 a typical amplifier for charging the condenser 35 in accordance with the light falling upon the photocell 4 comprising a further electron discharge tube 36 energized from a source 37 and including in its anode circuit the condenser 35 shunted by its discharge resistance 38. The grid circuit of the discharge tube 36, including the grid-leak resistor 39, is connected to the photo-electric cell 4 through a coupling condenser 40. The photo-electric cell 4 is energized, in series with a resistor 41, from a source 42, the coupling condenser 40 being connected to the junction of 4 and 41 in the conventional manner.

While I have shown only a single amplifier tube 36 in order to illustrate the principle of operation of my invention, it will be understood by those skilled in the art that I may use any number of desired tubes which may be connected in a similar manner as is well known in the art.

According to this arrangement the amplifier tube 36 will be arranged to be actuated by the photocell only when an object interrupts the light falling upon the photocell 4 from the light source 2. Each time an object passes across the light beam the condenser 35 will be charged. When the condenser is charged, as shown by the connections in the drawing, a negative voltage is applied to the grid of the tube 34 causing the relay to drop out, closing the contacts 33 and starting the escalator motor. After the passenger has passed on to the escalator the charge held by the condenser 35 will leak off through the resistor 38. When the charge is substantially dissipated the negative voltage will cease to be applied to the grid of 34 and the relay 30 will pick up, closing the contacts 32, and shutting down the escalator motor.

The invention may be applied to industrial conveyers in which case the field of the light-sensitive device may embrace that point at which articles are presented to the conveyer from a chute or other delivery means. Every time an article is deposited at this point, the conveyer will start up and deliver the article. It will operate continuously if there is a constant supply of articles.

The invention may be applied to all kinds of industrial conveyers which normally are in continuous operation irrespective of the rate of supply of articles or material. Other applications of the invention will be apparent to those skilled in the art.

I claim:—

1. In a control system for conveyers the combination of a conveyer, a motor for driving said conveyer, a motor starter controlling said motor, said motor starter comprising a starting contact and a stopping contact, means comprising an electron discharge tube for operating said starting contact substantially instantaneously on approach of an object to be conveyed and means for thereafter operating said stopping contact with a predetermined time delay.

2. In a control system for conveyers the combination of a conveyer, a motor for driving said conveyer, a motor starter controlling said motor, said motor starter comprising a starting contact and a stopping contact, means comprising an amplifier and a quick-acting relay associated therewith, for operating said starting contact substantially instantaneously on the approach of an object to be conveyed, and means comprising a time delay device controlled by said quick-acting relay for thereafter operating said stopping contact.

3. In a control system for conveyers the combination of a conveyer, a motor for driving said conveyer, a motor starter controlling said motor, said motor starter comprising a starting contact and a stopping contact, means for operating said starting contact substantially instantaneously on approach of an object to be conveyed, means for thereafter operating said stopping contact with a predetermined time delay, and means for avoiding repeated operation of said contacts when a number of objects follow successively at intervals less than said predetermined time interval.

4. In a control system for conveyers the combination of a conveyer, a motor for driving said conveyer, a motor starter controlling said motor, said motor starter comprising a starting contact and a stopping contact, means for operating said starting contact substantially instantaneously on approach of an object to be conveyed, means for thereafter operating said stopping contact with a predetermined time delay, and means for avoiding repeated operation of said contacts when a number of objects follow successively at intervals less than said predetermined time interval, comprising means for charging an energy storing device substantially instantaneously and further means for discharging said energy storing device over a predetermined period.

5. In a control system for conveyers the combination of a conveyer, a motor for driving said conveyer, a motor starter controlling said motor, said motor starter comprising a starting contact and a stopping contact, means for operating said starting contact substantially instantaneously on approach of an object to be conveyed, means for thereafter operating said stopping contact with a predetermined time delay, and means for avoiding repeated operation of said contacts when a number of objects follow successively at intervals less than said predetermined time interval, comprising rectifying means for charging a condenser substantially instantaneously and further means for allowing said condenser to discharge over a predetermined period.

6. In a control system for conveyers the combination of a conveyer, a motor for driving said conveyer, a motor starter controlling said motor, said motor starter comprising a starting contact and a stopping contact, means comprising a light-sensitive cell, a source of light co-operating therewith, an amplifier to amplify the output of said light-sensitive device, said amplifier comprising a condenser adapted to be charged substantially instantaneously by impulses from said light-sensitive cell, and a high resistance leakage path for discharging said condenser over a predetermined period, said means operating said starting contact substantially instantaneously on approach of an object to be conveyed and thereafter operating said stopping contact with a predetermined time delay.

7. In a control system for conveyers the combination of a conveyer, a motor for driving said conveyer, a motor starter controlling said motor, said motor starter comprising a starting contact and a stopping contact, a light-sensitive cell and a relay controlled by said light-sensitive cell, said relay operating rapidly to operate said starting contact, on actuation by said light-sensitive cell, and falling off slowly to operate said stopping contact.

8. In a control system for motor driven escalators, the combination of an escalator, a motor for driving said escalator, a motor starter controlling said motor, a light sensitive cell, a relay controlled by said light sensitive cell, said relay operating in one direction substantially instantaneously and in the other direction after a predetermined time delay, said motor starter being controlled by said relay so as to start said motor when said relay is operated in said first direction and to stop said motor when said relay is operated in said second direction.

9. In a control system for conveyers the combination of a conveyer, a motor for driving said conveyer, a motor starter controlling said motor, said motor starter comprising a starting contact and a stopping contact, a light-sensitive cell and a relay controlled by said light-sensitive cell, said relay operating substantially instantaneously to operate said starting contact, on actuation by said light-sensitive cell, and operating said stopping contact after a pre-determined time delay.

10. In a control system for motor driven escalators, the combination of an escalator, a motor for driving said escalator, a motor starter controlling said motor, a photo-electric cell, an electron tube for amplifying photo-electric currents derived from said cell, a condenser, said condenser being charged in accordance with the space current in said electron tube, means for discharging said condenser after a pre-determined time delay, a second electron tube, the space current in said second tube being controlled in accordance with the voltage of said condenser, a relay controlled by said last mentioned space current, said motor starter being controlled by said relay so as to start motor when said relay is operated in one direction and to stop said motor when said relay is operated in another direction.

ALAN S. FITZ GERALD.